I

United States Patent
Ichikawa et al.

(10) Patent No.: US 11,818,753 B2
(45) Date of Patent: Nov. 14, 2023

(54) RANDOM ACCESS WAIT TIME SETTING METHOD

(71) Applicant: NTT DOCOMO, INC., Chiyoda-ku (JP)

(72) Inventors: Kazuoki Ichikawa, Chiyoda-ku (JP); Takashi Okada, Chiyoda-ku (JP); Yuuta Higuchi, Chiyoda-ku (JP); Satoshi Denno, Okayama (JP)

(73) Assignee: NTT DOCOMO, INC., Tokyo (JP)

( * ) Notice: Subject to any disclaimer, the term of this patent is extended or adjusted under 35 U.S.C. 154(b) by 491 days.

(21) Appl. No.: 17/272,796

(22) PCT Filed: Jul. 11, 2019

(86) PCT No.: PCT/JP2019/027428
§ 371 (c)(1),
(2) Date: Mar. 2, 2021

(87) PCT Pub. No.: WO2020/049868
PCT Pub. Date: Mar. 12, 2020

(65) Prior Publication Data
US 2021/0282177 A1    Sep. 9, 2021

(30) Foreign Application Priority Data
Sep. 5, 2018   (JP) ................. 2018-166124

(51) Int. Cl.
*H04W 74/00* (2009.01)
*H04W 60/00* (2009.01)
*H04W 64/00* (2009.01)
*H04W 74/08* (2009.01)

(52) U.S. Cl.
CPC ......... *H04W 74/004* (2013.01); *H04W 60/00* (2013.01); *H04W 64/006* (2013.01); *H04W 74/0833* (2013.01)

(58) Field of Classification Search
None
See application file for complete search history.

(56) References Cited

U.S. PATENT DOCUMENTS

2018/0213566 A1* 7/2018 Baron ................. H04W 72/569

* cited by examiner

*Primary Examiner* — Saad Khawar
(74) *Attorney, Agent, or Firm* — Oblon, McClelland, Maier & Neustadt, L.L.P.

(57) ABSTRACT

Information indicating a base station apparatus with which each of a terminal apparatus T-k and other terminal apparatuses that are to perform location registration in a service area of a base station apparatus B(k) with which the terminal apparatus T-k is to perform location registration is shared among all the terminal apparatuses that are to perform location registration in the service area. A maximum wait time is set longer, the greater the number of other terminal apparatuses that are scheduled to perform location registration with the base station apparatus B(k) with respect to which the terminal apparatus T-k is to perform location registration is, the maximum wait time being a maximum wait time for the terminal apparatus T-K to access the base station apparatus B(k).

8 Claims, 6 Drawing Sheets

RANDOM ACCESS WAIT TIME SETTING METHOD

TECHNICAL FIELD

The present invention relates to a random access wait time setting technology that can prevent congestion that is caused by concentrated access of terminal apparatuses to a base station apparatus.

BACKGROUND ART

One technical requirement of the 5th Generation Mobile Communications System that is currently being developed is "simultaneous connection of an extremely large number of terminal apparatuses".

When a large number of terminal apparatuses attempt to access one base station apparatus, a problem of congestion in a random access channel is possibly caused at an initial stage.

There are several known solutions on the congestion in the random access channel.

(1) To limit the total number of terminal apparatuses that can access a base station apparatus by the base station apparatus applying call restriction to each terminal apparatus.

(2) To autonomously increase the number of random access channels at a base station apparatus where congestion tends to occur.

(3) To provide a moving cell in an environment, such as in trains or buses, where a large number of terminal apparatuses are known beforehand to move at the same time.

PRIOR ART LITERATURE

Non-Patent Literature

Non-patent literature 1: Services and Requirements of 5G—Requirements of 5G, NTT DOCOMO, INC., [searched on Jun. 1, 2018], Internet <https://www.nttdocomo.co.jp/corporate/technology/rd/tech/5g/5g01/02/02.html>

Non-patent literature 2: Securement of Important Communication, NTT DOCOMO, INC., [searched on Jun. 1, 2018], Internet <https://www.nttdocomo.co.jp/corporate/csr/disaster/secure_connection/index.html>

SUMMARY OF THE INVENTION

Problems to be Solved by the Invention

The solutions (1) and (2) described above are passive solutions against congestion that can be taken by a base station apparatus that is accessed by terminal apparatuses. The solution (3) described above is a solution that can be taken only in a specific environment. The solution (1) described above may be disadvantageous to users using the terminal apparatuses. With the solution (2) described above, because the number of random access channels cannot be indefinitely increased, congestion that is caused by a significant increase in traffic is possibly not avoided. The above-described (3) cannot be adopted in an environment other than an environment where a moving cell can be provided.

Accordingly, an object of the present invention is to newly provide a random access wait time setting technology by which congestion caused by concentrated access of terminal apparatuses to a base station apparatus can be avoided.

Means to Solve the Problems

According to the present invention, a maximum wait time for a terminal apparatus to access a base station apparatus is set longer, the greater the number of other terminal apparatuses that are scheduled to perform location registration with the base station apparatus with respect to which the terminal apparatus is to perform location registration.

Effects of the Invention

According to the present invention, a terminal apparatus autonomously sets, for itself, a longer wait time to access a base station apparatus, the greater the number of terminal apparatuses that are scheduled to perform location registration with the same base station apparatus, and congestion may thus be avoided.

DETAILED DESCRIPTION OF THE EMBODIMENTS

Embodiments of the present invention will be described with reference to the drawings.

First Embodiment

Figure 1:
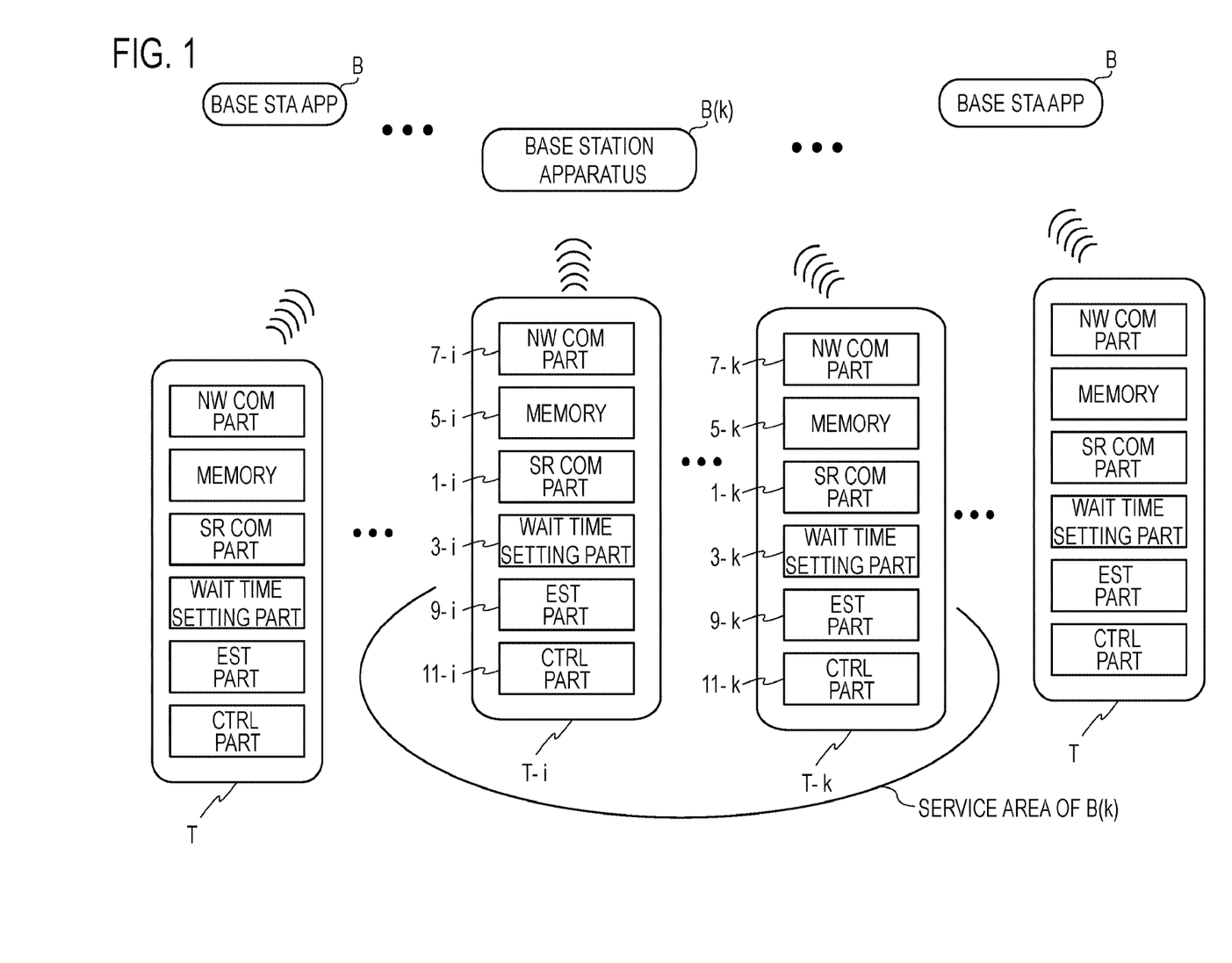
FIG. 1 is a diagram showing an example configuration of a communication system.

In the present embodiment, a communication system shown in FIG. 1 includes a large number of base station apparatuses B, and a large number of terminal apparatuses T-$i$ ($i$ is an integer of 1 or more). Each terminal apparatus T-$i$ includes a short-range communication part 1-$i$, a wait time setting part 3-$i$, a memory 5-$i$, a NW communication part 7-$i$, an estimation part 9-$i$, and a control part 11-$i$.

The following process (see FIG. 2) is performed before any terminal apparatus T-$k$ ($k \in \{i | i$ is an integer of 1 or more$\}$) newly enters a service area of a certain base station apparatus B (hereinafter, this base station apparatus B will be referred to as "base station apparatus B($k$)") and attempts to perform location registration with the base station apparatus B($k$).

Figure 2:
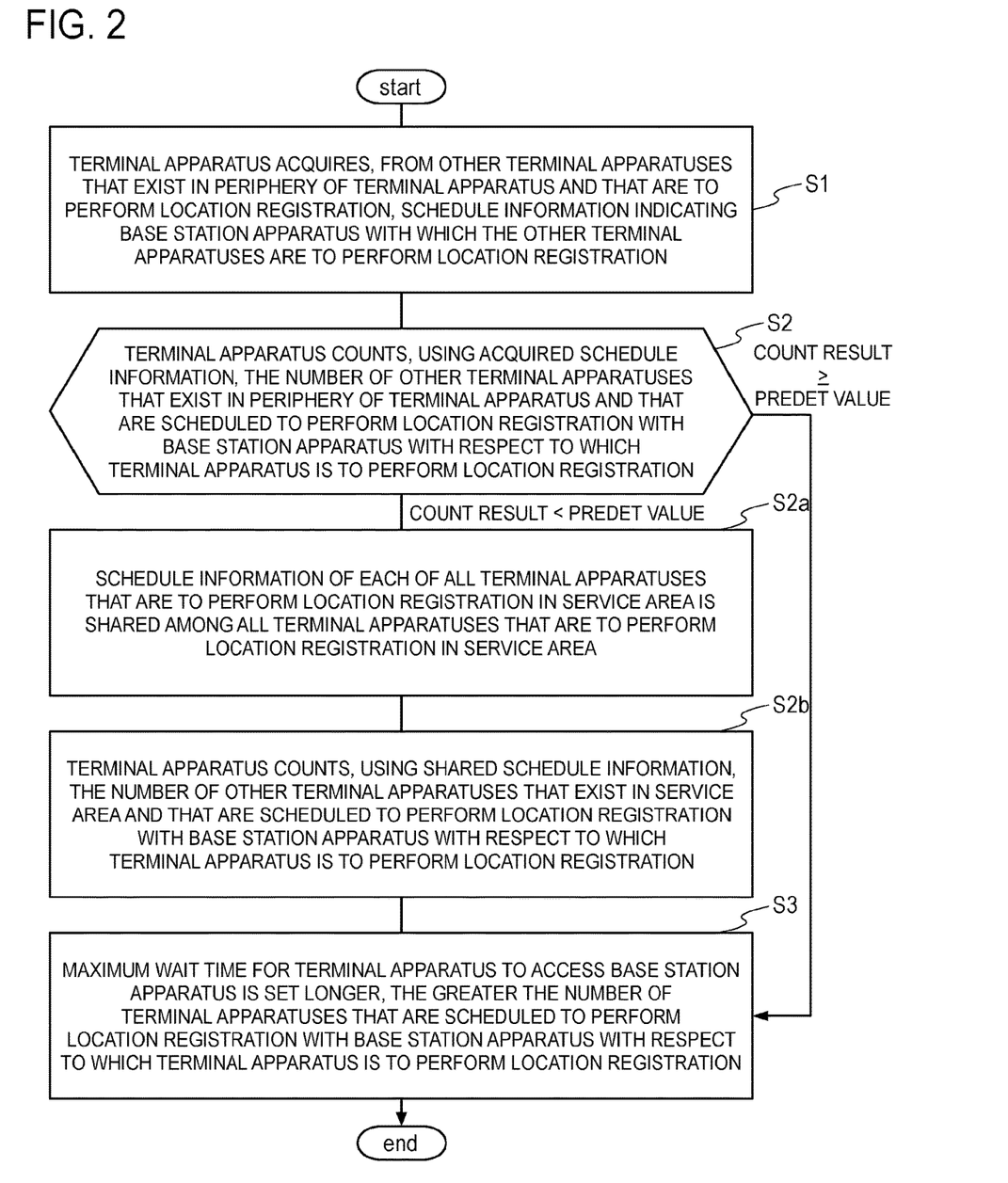
FIG. 2 is a process flowchart according to a first embodiment.

First, the terminal apparatus T-$k$ acquires, from another terminal apparatus T-$i$ that exists in the periphery of the terminal apparatus T-$k$ and that is to perform location registration, schedule information indicating the base station apparatus with which the other terminal apparatus T-$i$ is to perform location registration (step S1). The control part 11-$k$ of the terminal apparatus T-$k$ transmits, via the short-range communication part 1-$k$ that performs short-range wireless communication (IEEE802.11, Bluetooth (registered trademark), etc.), to a terminal apparatus T-$k_j$ ($k_j \in \{i | i$ is an integer of 1 or more}–{k}, j∈{1, ..., M}) that is present within a reachable range of short-range radio, a request requesting for the schedule information indicating the base station apparatus that the terminal apparatus T-$k_j$ is to perform location registration. In the present example, the number of terminal apparatuses that are within the reachable range of short-range radio is given as M.

The short-range communication part 1-$k_j$ of the terminal apparatus T-$k_j$ ($k_j$∈{i|i is an integer of 1 or more}–{k}, j∈{1, ..., M}) receives the request. In the case where the terminal apparatus T-$k_j$ is to perform location registration with a base station apparatus, the control part 11-$k_j$ of the terminal apparatus T-$k_j$ transmits, to the terminal apparatus T-k, via the short-range communication part 1-$k_j$, the schedule information indicating the base station apparatus with which the terminal apparatus T-$k_j$ is to perform location registration. In the present example, the number of the terminal apparatuses that are to perform location registration with the base station apparatus, among the M terminal apparatuses, is given as N.

As a result, the short-range communication part 1-k of the terminal apparatus T-k acquires, from the terminal apparatus T-$k_h$ ($k_h$∈{i|i is an integer of 1 or more}–{k}, h∈{1, ..., N}, {$k_1$, ..., $k_h$, ..., $k_N$} ⊂ {$k_1$, ..., $k_j$, ..., $k_M$}) that exists in the periphery of the terminal apparatus T-k and that is to perform location registration, the schedule information indicating the base station apparatus B($k_h$) with which the terminal apparatus T-$k_h$ is to perform location registration. The acquired schedule information is stored in the memory 5-k of the terminal apparatus T-k.

Each terminal apparatus T-i that is to perform location registration in the service area of the base station apparatus B(k) performs the process in step S1.

Next, the control part 11-k of the terminal apparatus T-k counts, using the schedule information acquired in the process in step S1, the number of other terminal apparatuses T-i that exist in the periphery of the terminal apparatus T-k and that are scheduled to perform location registration with the base station apparatus B(k) with respect to which the terminal apparatus T-k is to perform location registration (step S2). A counting result L is stored in the memory 5-k of the terminal apparatus T-k. In the case where the counting result L is smaller than a predetermined value Lmax, the control part 11-k performs control to perform the process in step S2a, and in the case where the counting result L is at or greater than the predetermined value Lmax, the control part 11-k performs control to perform the process in step S3. In the case where the process in step S2a is to be performed, the counting result obtained in the process in step S2 is discarded.

In the process in step S2a, a process is performed to share, among all the terminal apparatuses (including the terminal apparatus T-k) that are to perform location registration in the service area of the base station apparatus B(k), the schedule information of each of all the terminal apparatuses (including the terminal apparatus T-k) that are to perform location registration in the service area of the base station apparatus B(k).

Specifically, the process in step S2a is as follows. A mesh network is constructed by all the terminal apparatuses T-i that are to perform location registration in the service area of the base station apparatus B(k), by using the short-range communication parts 1-i. The method of constructing a mesh network is already known, and a description thereof is omitted. Moreover, the mesh network is a mesh network including a multi-hop function. The mesh network may include a terminal apparatus for which location registration is already complete. The schedule information collected by each of the terminal apparatuses T-i that are to perform location registration in the service area of the base station apparatus B(k) is shared, via the mesh network, among all the terminal apparatuses T-i that are to perform location registration in the service area of the base station apparatus B(k). The schedule information that is shared is stored in the memory 5-i of each terminal apparatus T-i. As a result, the terminal apparatus T-k is enabled to count the number of terminal apparatuses T-i that are scheduled to perform location registration with the base station apparatus B(k) in the service area of the base station apparatus B(k) (this process is performed in the process in a next step S2b).

The control part 11-k of the terminal apparatus T-k counts, using the schedule information that is shared in the process in step S2a, the number of other terminal apparatuses T-i that exist in the service area of the base station apparatus B(k) and that are scheduled to perform location registration with the base station apparatus B(k) with respect to which the terminal apparatus T-k is to perform location registration (step S2b). The counting result is given as L. The counting result L is stored in the memory 5-k of the terminal apparatus T-k.

In the process in step S3, the wait time setting part 3-k of the terminal apparatus T-k sets a longer maximum wait time, the greater the number of terminal apparatuses that are scheduled to perform location registration with the base station apparatus B(k) with respect to which the terminal apparatus T-k is to perform location registration, and sets a shorter maximum wait time, the smaller the number of such terminal apparatuses as mentioned above, the maximum wait time being a maximum wait time for the terminal apparatus T-k to access the base station apparatus B(k).

For example, by using the number P of terminal apparatuses that are capable of simultaneously occupying a physical random access channel to the base station apparatus B(k), and the counting result L obtained in the process in step S2 or step S2b, the wait time setting part 3-k sets the maximum wait time to initial value+L−P when L−P>0, and sets the maximum wait time to the initial value when L−P≤0. For example, according to Third Generation Partnership Project (3GPP), the initial value is 1. P is already notified in the service area by the base station apparatus B(k), and is known to the terminal apparatus T-k. The predetermined value Lmax described above is set to prevent the wait time from becoming too long.

A transmission timing at which the terminal apparatus T-k attempts to perform location registration with the base station apparatus B(k) via the NW communication part 7-k is randomly set within the maximum wait time set in the process in step S3 as the upper limit.

According to the first embodiment, the terminal apparatus may detect, by itself, temporary concentration of access, without depending on the base station apparatus, and the terminal apparatus autonomously sets its wait time according to the peripheral environment, and thus, occurrence of congestion may be prevented.

Second Embodiment

Figure 3:
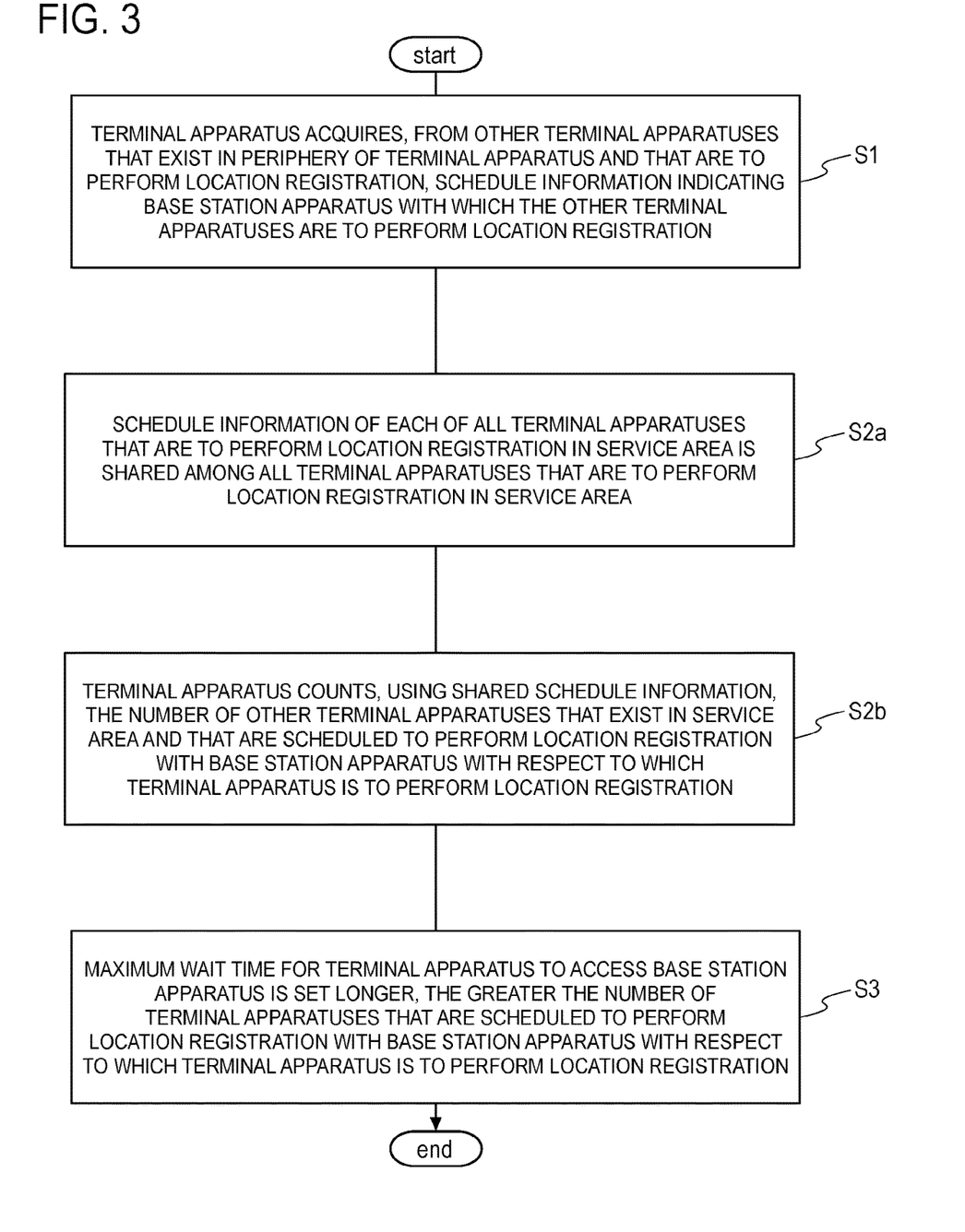
FIG. 3 is a process flowchart according to a second embodiment.

A second embodiment (see FIG. 3) is a simplified mode of the first embodiment, and the process in step S2 is omitted. That is, in the second embodiment, processes are performed in the order of steps S1, S2a, S2b, and S3.

Third Embodiment

In a third embodiment (see FIG. 4), unlike in the first embodiment, the estimation part 9-k of the terminal apparatus T-k includes the process in step S1a of estimating movement directions of other terminal apparatuses T-i that exist in the periphery of the terminal apparatus T-k and that are to perform location registration. For example, estimation of the movement direction is performed by observing Doppler frequency shift between the terminal apparatuses, or a temporal change in an electric field intensity of the short-range wireless communication.

Figure 4:
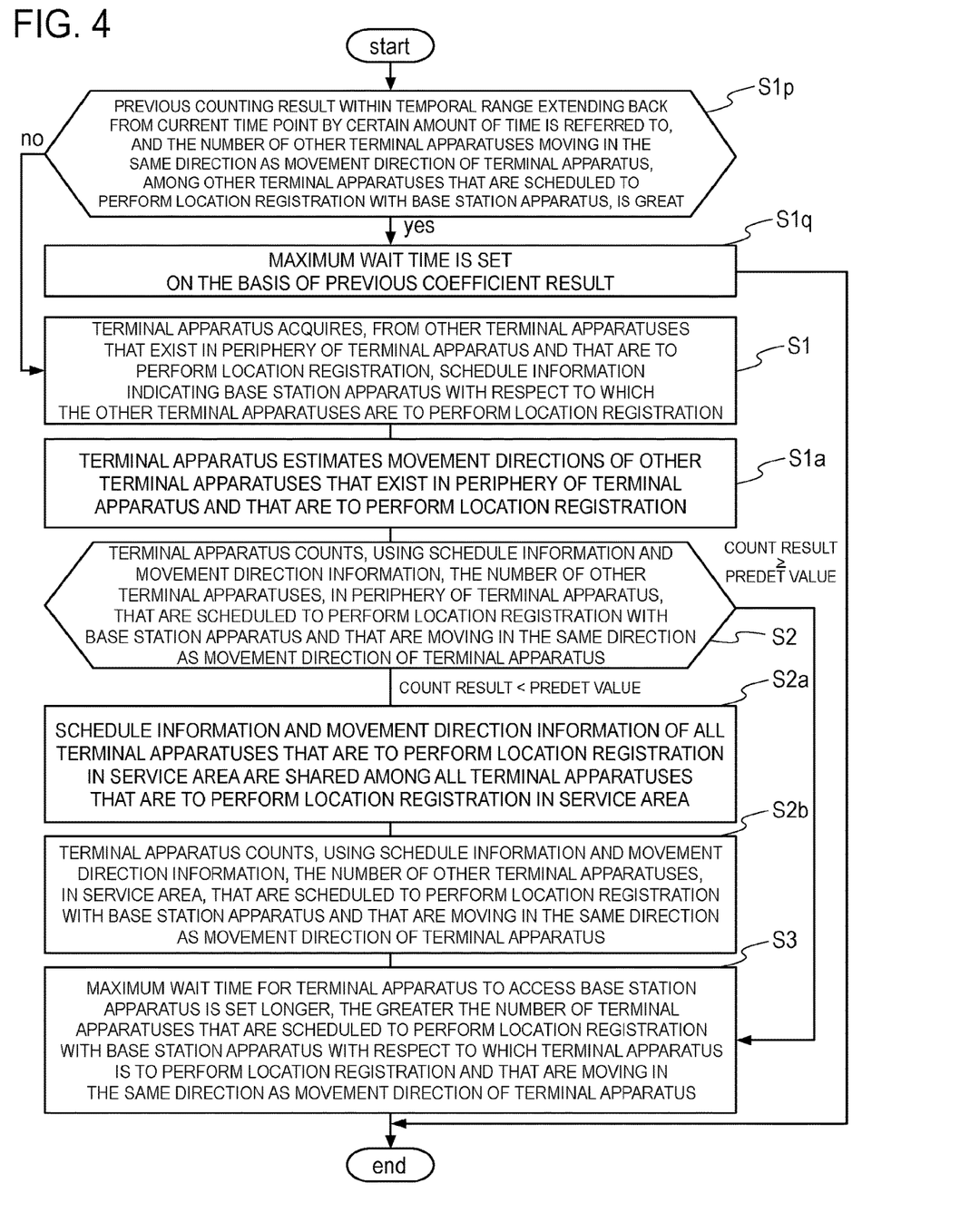
FIG. 4 is a process flowchart according to a third embodiment.

In the third embodiment, unlike in the first embodiment, the control part 11-k of the terminal apparatus T-k also counts, in the process in step S2, using the schedule information and the information about the movement direction, the number of other terminal apparatuses T-i that exist in the periphery of the terminal apparatus T-k, that are moving in a same direction as the movement direction of the terminal apparatus T-k, and that are scheduled to perform location registration with the base station apparatus B(k) with respect to which the terminal apparatus T-k is to perform location registration. The counting result is stored in the memory 5-k of the terminal apparatus T-k.

In the third embodiment, unlike in the first embodiment, the information about the movement direction is also shared in the process in step S2a, in addition to the schedule information.

In the third embodiment, unlike in the first embodiment, the control part 11-k of the terminal apparatus T-k counts, in the process in step S2b, using the schedule information and the information about the movement direction, the number of other terminal apparatuses T-i in the service area that are moving in the same direction as the movement direction of the terminal apparatus T-k and that are scheduled to perform location registration with the base station apparatus B(k) with respect to which the terminal apparatus T-k is to perform location registration. The counting result is stored in the memory 5-k of the terminal apparatus T-k.

In the third embodiment, unlike in the first embodiment, the wait time setting part 3-k of the terminal apparatus T-k sets, in the process in step S3, a longer maximum wait time, the greater the number of terminal apparatuses that are moving in the same direction as the movement direction of the terminal apparatus T-k and that are scheduled to perform location registration with the base station apparatus B(k) with respect to which the terminal apparatus T-k is to perform location registration, and a shorter maximum wait time, the smaller the number of such terminal apparatuses as mentioned above, the maximum wait time being a maximum wait time for the terminal apparatus T-k to access the base station apparatus B(k).

In the third embodiment, the process in step S1p is performed before the process in step S1. In the process in step S1p, the control part 11-k of the terminal apparatus T-k refers to a previous counting result, stored in the memory 5-k, within a time range extending back from a current time point by a certain amount of time, and performs control to perform the process in step S1q in a case where the number of other terminal apparatuses T-i that are moving in the same direction as the movement direction of the terminal apparatus T-k, among other terminal apparatuses T-i that are scheduled to perform location registration with the base station apparatus B(k), is greater than a predetermined value (for example, 90% or more), and performs control to perform the process in step S1 in other cases. In the process in step S1q, the wait time setting part 3-k of the terminal apparatus T-k sets the maximum wait time on the basis of the previous counting result. Accordingly, in the case where a large number of terminal apparatuses are moving as a group in a same direction, the processes in steps S1 to S3 are not performed at the time of movement to a next service area, and the time until random access is started may be reduced.

Fourth Embodiment

Figure 5:
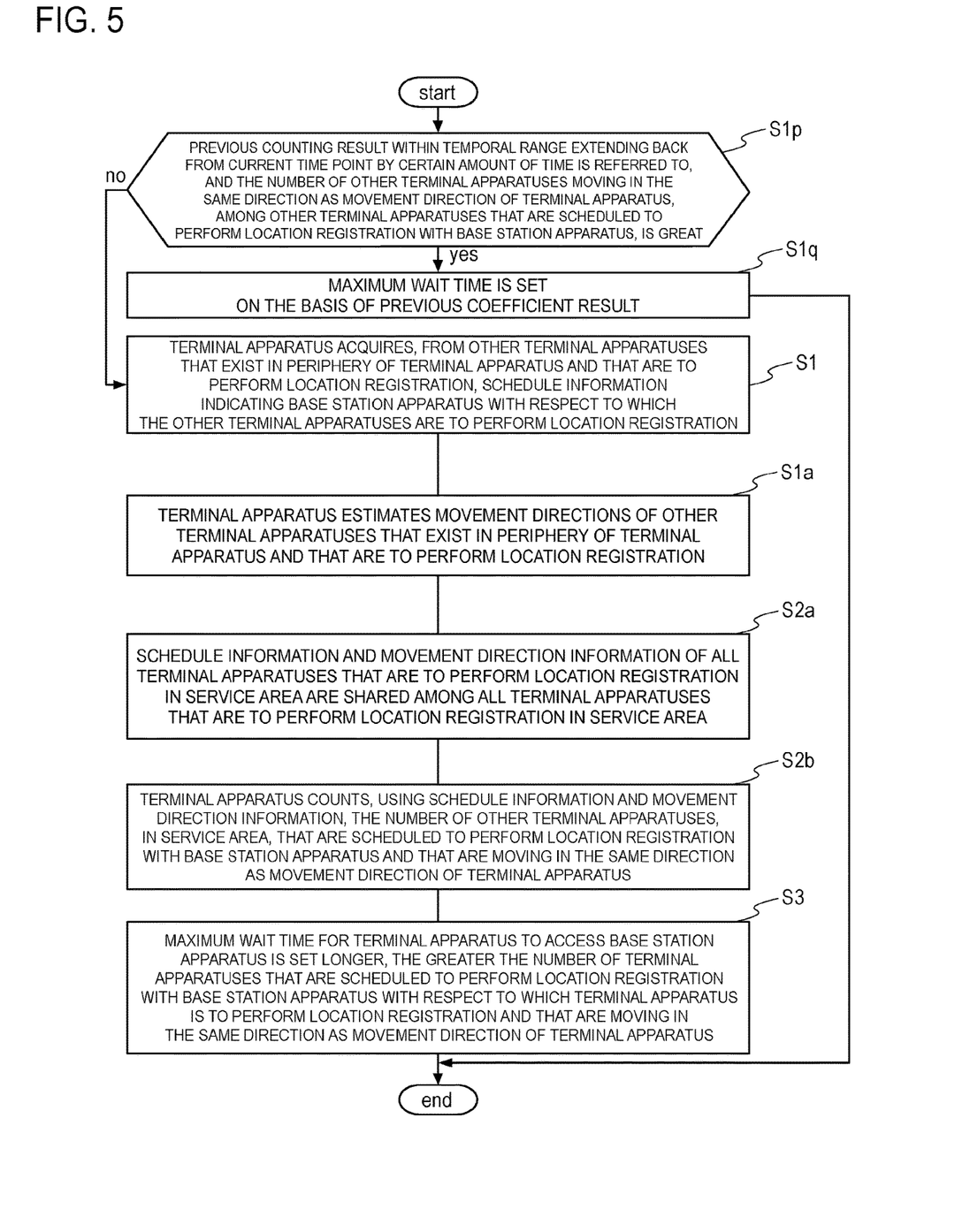
FIG. 5 is a process flowchart according to a fourth embodiment.

A fourth embodiment (see FIG. 5) is a simplified mode of the third embodiment, and the process in step S2 can be omitted, as in the second embodiment.

<Modification>

In the process in step S3 in the first embodiment or the second embodiment, or in the process in step S1p in the third embodiment or the fourth embodiment, the wait time setting part 3-k may correct the counting result L on the basis of an amount of temporal change y in the counting result L. Specifically, the wait time setting part 3-k takes a result of multiplying the counting result L by 1+y as a new counting result L, and sets the maximum wait time to initial value+ L−P when L−P>0, and sets the maximum wait time to the initial value when L−P≤0. As the amount of temporal change y, it is desirable to use a temporal change in the counting result for each service area in a temporal range extending back by a certain amount of time (such as about 1 to 2 hours) from a time point of counting the number of terminal apparatuses that are scheduled to perform location registration with the base station apparatus B(k) in a current service area where the terminal apparatus T-k is located. Furthermore, an upper limit value and a lower limit value may be set for the amount of temporal change y (for example, −0.5≤y≤1.0). According to the modification, the maximum wait time is appropriately set according to a concentration trend or a separation trend of the terminal apparatuses with respect to the service area.

<Hardware Configuration>

Additionally, the block diagram used to describe the embodiments described above shows blocks in functional units. These functional blocks (structural parts) are achieved by an arbitrary combination of at least one of hardware and software. Moreover, a method of achieving each functional block is not particularly specified. That is, each functional block may be achieved by using one apparatus that is physically or logically coupled, or may be achieved by using a plurality of apparatuses by directly or indirectly (in a wired or wireless manner, for example) connecting two or more apparatuses that are physically or logically separated. The functional block may be achieved by combining software with the one apparatus or the plurality of apparatuses described above.

Functions are, but not limited to, determining, determining, judging, calculating, computing, processing, deriving, investigating, looking up, search, inquiry, ascertaining, receiving, transmitting, output, accessing, resolving, selecting, choosing, establishing, comparing, assuming, expecting, considering, broadcasting, notifying, communicating, forwarding, configuring, reconfiguring, allocating, mapping, and assigning. For example, a functional block (structural part) to achieve the function of transmitting is referred to as a transmitting unit or a transmitter. As described above, in any case, the method of achieving is not particularly specified.

Figure 6:
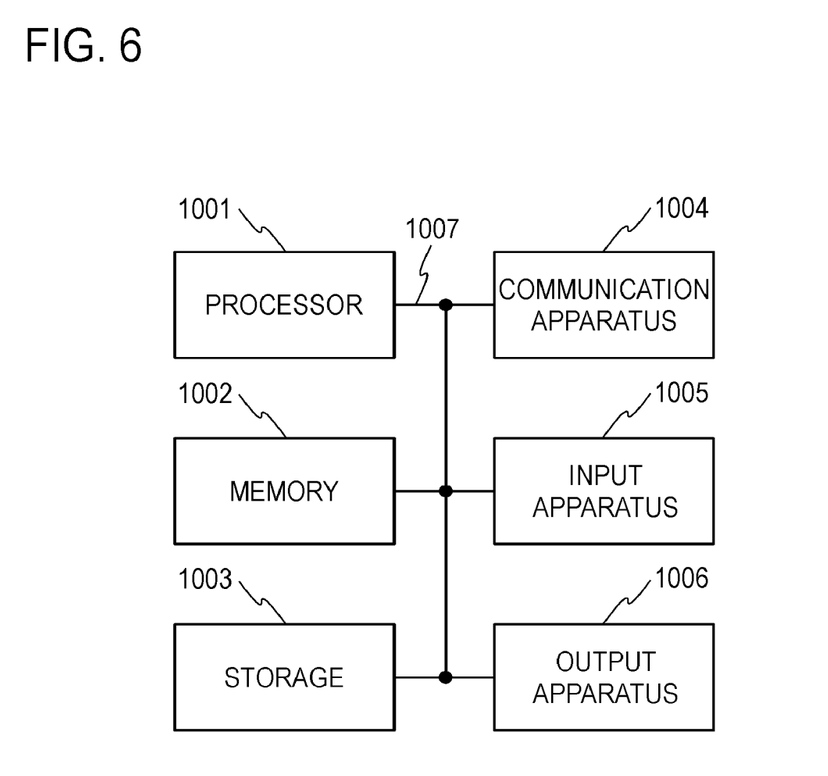
FIG. 6 is an example hardware configuration.

For example, the base station apparatus, the terminal apparatus and the like of an embodiment of the present disclosure may function as a computer that performs processing according to a wireless communication method of the present disclosure. FIG. 6 is a diagram showing an example of a hardware configuration of the base station apparatus and the terminal apparatus according to an embodiment of the present disclosure. Physically, the base station apparatus and the terminal apparatus described above may be configured as a computer apparatus including a processor 1001, a memory 1002, a storage 1003, a communication apparatus 1004, an input apparatus 1005, an output apparatus 1006, a bus 1007, and the like.

Additionally, in the following description, the term "apparatus" may be substituted by circuit, device, unit or the like. The hardware configuration of the base station apparatus and the terminal apparatus may be configured to include one or a plurality of each apparatus shown in the drawing, or may be configured without including one or some of the apparatuses.

Each function of the base station apparatus and the terminal apparatus is achieved by loading predetermined software (program) on hardware such as the processor 1001 or the memory 1002, and the processor 1001 performing arithmetic operation to control communication by the communication apparatus 1004 or to control at least one of reading and writing of data in the memory 1002 and the storage 1003.

For example, the processor 1001 controls the entire computer by causing an operating system to operate. The processor 1001 may be configured by a central processing unit (CPU) including an interface to a peripheral apparatus, a control apparatus, an arithmetic apparatus, a register and the like. For example, the control part described above may be achieved by the processor 1001.

Furthermore, the processor 1001 reads programs (program codes), software modules, data and the like from at least one of the storage 1003 and the communication apparatus 1004 and into the memory 1002, and performs various processes according to the programs, the software modules, the data and the like. As the program, a program for causing a computer to perform at least a part of the operation described in the embodiments described above is used. For example, the control part of the terminal apparatus may be achieved by a control program that is stored in the memory 1002 and that operates on the processor 1001, and the same can be said for other functional blocks. Various processes mentioned above are described to be performed by one processor 1001, but the processes may be simultaneously or sequentially performed by two or more processors 1001. The processor 1001 may be implemented by one or more chips. Additionally, a program may be transmitted from a network via a telecommunication line.

The memory 1002 is a computer-readable recording medium, and may be configured by at least one of a read only memory (ROM), an erasable programmable ROM (EPROM), an electrically erasable programmable ROM (EEPROM), and a random access memory (RAM), for example. The memory 1002 may also be referred to as a register, a cache, a main memory (main storage apparatus), and the like. The memory 1002 is capable of storing programs (program codes), software modules and the like that can be executed to perform the wireless communication method according to an embodiment of the present disclosure.

The storage 1003 is a computer-readable recording medium, and may be configured by at least one of an optical disc such as a compact disc ROM (CD-ROM), a hard disk drive, a flexible disk, a magneto-optical disk (such as a compact disc, a digital versatile disc, or a Blu-ray (registered trademark) disc), a smart card, a flash memory (such as a card, a stick, or a key drive), a floppy (registered trademark) disc, and a magnetic strip, for example. The storage 1003 may also be referred to as an auxiliary storage apparatus. The storage medium mentioned above may be a database, a server, or any other appropriate medium including at least one of the memory 1002 and the storage 1003, for example.

The communication apparatus 1004 is hardware (transmitting/receiving device) for performing communication with a computer via at least one of a wired network and a wireless network, and is also referred to as a network device, a network controller, a network card, or a communication module, for example. The communication apparatus 1004 may include a high-frequency switch, a duplexer, a filter, a frequency synthesizer and the like to achieve at least one of frequency division duplex (FDD) and time division duplex (TDD), for example. A transmitting/receiving part 103 may be implemented by being physically or logically divided into a transmitting part 103a and a receiving part 103b.

The input apparatus 1005 is an input device for receiving input from outside (such as a keyboard, a mouse, a microphone, a switch, a button, or a sensor). The output apparatus 1006 is an output device for performing output to outside (such as a display, a speaker, or an LED lamp). Additionally, the input apparatus 1005 and the output apparatus 1006 may be integrally configured (as a touch panel, for example).

Furthermore, each apparatus such as the processor 1001 and the memory 1002 is connected by the bus 1007 for communicating information. The bus 1007 may be configured by a single bus, or different buses may be used between apparatuses.

Moreover, the base station apparatus and the terminal apparatus may include hardware such as a microprocessor, a digital signal processor (DSP), an application specific integrated circuit (ASIC), a programmable logic device (PLD), or a field programmable gate array (FPGA), and some or all of each functional block may be achieved by such hardware. For example, the processor 1001 may be implemented by using at least one of the pieces of hardware.

Each mode/embodiment described in the present disclosure may be applied to at least one of a system that uses Long Term Evolution (LTE), LTE-Advanced (LTE-A), SUPER 3G, IMT-Advanced, 4th generation mobile communication system (4G), 5th generation mobile communication system (5G), Future Radio Access (FRA), new Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or any other appropriate system and a next generation system extended according to the above. Furthermore, application of a combination of a plurality of systems (such as a combination of at least one of LTE and LTE-A, and 5G) is also possible.

The order of the procedure, the sequence, the flowchart and the like of each mode/embodiment described in the present disclosure may be changed to the extent that there is no conflict. For example, with the method described in the present disclosure, various steps are presented according to an exemplary order, but the method is not limited to the specific order that is presented.

Information and the like that are input/output may be stored in a specific location (such as a memory), or may be managed using a management table. Information and the like that are input/output may be overwritten, updated, or supplemented. Information and the like that are output may be deleted. Information and the like that are input may be transmitted to other apparatuses.

Judgment may be performed by a value that is expressed by one bit (0 or 1), or may be performed by a truth value (Boolean; true or false), or may be performed by comparison of numerical values (for example, comparison with a predetermined value).

Each mode/embodiment described in the present disclosure may be used independently, or may be used in combination, or switching may be performed during execution. Furthermore, notification of predetermined information (such as a notification of "being X") is not limited to be performed explicitly, but may be performed implicitly (for example, by not performing notification of the predetermined information).

Heretofore, a detailed description has been given of the present disclosure, but it is apparent to those skilled in the art that the present disclosure is not limited to the embodiments described in the present disclosure. Modifications and alterations may be made to the present disclosure without departing from the spirit and scope of the present disclosure determined by the claims. Accordingly, the description of the present disclosure is for illustrative purpose only, and is not intended to limit the present disclosure in any way.

Software should be interpreted broadly regardless of whether it is referred to as software, firmware, middleware, microcode, hardware description language or by other names, and may refer to instruction, instruction set, code, code segment, program code, program, subprogram, software module, application, software application, software package, routine, subroutine, object, executable file, execution thread, procedure, function and the like.

Moreover, software, instruction, information and the like may be transmitted/received via a transmission medium. For example, in a case where software is transmitted from a website, a server, or other remote resources using at least one of wired technology (such as a coaxial cable, an optical fiber cable, a twist pair, or a digital subscriber line (DSL)) and wireless technology (such as infrared rays or microwaves), at least one of such wired technology and wireless technology is included in the definition of the transmission medium.

Information, signals and the like described in the present disclosure may be expressed using any of various different techniques. For example, data, instructions, commands, information, signals, bits, symbols, chips and the like that are possibly referred to throughout the description given above may be expressed as voltage, current, electromagnetic wave, magnetic field or magnetic particle, optical field or photon, or any combination thereof.

Additionally, terms described in the present disclosure and terms necessary to understand the present disclosure may be substituted by terms having same or similar meanings. For example, at least one of a channel and a symbol may be a signal (signaling). Furthermore, a signal may be a message. Moreover, a component carrier (CC) may be referred to as a carrier frequency, a cell, a frequency carrier, or the like.

Terms "system" and "network" used in the present disclosure are interchangeably used.

Furthermore, information, parameters and the like described in the present disclosure may be expressed using an absolute value or by a relative value with respect to a predetermined value, or may be expressed using different corresponding information. For example, a radio resource may be indicated by an index.

Names used for parameters described above are not limiting in any way. Furthermore, mathematical expressions and the like using such parameters may be different from those explicitly disclosed in the present disclosure. Because various channels (such as PUCCH and PDCCH) and information elements can be identified by any appropriate names, various names assigned to the various channels and information elements are not limiting in any way.

In the present disclosure, terms such as "base station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", and "component carrier" may be interchangeably used. A base station may also be referred to by terms such as a marocell, a small cell, a femtocell, or a picocell.

A base station can accommodate one or more (such as three) cells. In a case where a base station accommodates a plurality of cells, an entire coverage area of the base station may be divided into smaller areas, and each of the smaller areas may also provide communication services by a base station subsystem (such as an indoor small base station (RRH: Remote Radio Head)). The term "cell" or "sector" refers to a part or all of the coverage area of at least one of the base station and the base station subsystem that provides communication services in the coverage.

In the present disclosure, terms such as "mobile station (MS)", "user terminal", "user equipment (UE)", and "terminal" may be interchangeably used.

A mobile station may also be referred to, by those skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission apparatus, a reception apparatus, a communication apparatus, or the like. Additionally, at least one of the base station and the mobile station may be a device that is mounted on a mobile body, a mobile body itself, or the like. The mobile body may be transport means (such as a car or an aircraft), an autonomously moving mobile body (such as a drone or an autonomous vehicle), or a robot (manned or unmanned). Additionally, at least one of the base station and the mobile station includes an apparatus that does not always move during communication operation. For example, at least one of the base station and the mobile station may be an Internet of Things (IoT) appliance, such as a sensor.

Terms "determining", "determining" used in the present disclosure may include various operations. For example, "determining", "determining" may include "determining", "determining" that judging, calculating, computing, processing, deriving, investigating, looking up, search, inquiry (for example, looking up in a table, a database, or another data structure), or ascertaining was performed. Furthermore, "determining", "determining" may include "determining", "determining" that receiving (for example, receiving information), transmitting (for example, transmitting information), input, output, or accessing (for example, accessing data in a memory) was performed. Moreover, "determining", "determining" may include "determining", "determining" that resolving, selecting, choosing, establishing, or comparing was performed. That is, "determining", "determining" may include "determining", "determining" that some kind of operation was performed. Furthermore, "determining (determining)" may be substituted by "assuming", "expecting", "considering", or the like.

Terms such as "connected", "coupled", or any variation thereof mean any direct or indirect connection or coupling between two or more elements, and may include presence of one or more intermediate elements between the "connected" or "coupled" two elements. Coupling or connection of elements may be physical, logical or a combination thereof. For example, "connected" may be substituted by "accessed". In the case of the present disclosure, two elements may be considered to be mutually "connected" or "coupled" by using at least one of one or more wires, cables and printed electrical connections, and, as some non-limiting and non-inclusive examples, by using electromagnetic energy with a wavelength in a radio frequency range, a microwave range, and an optical range (both visible and invisible).

The expression "on the basis of" used in the present disclosure does not mean "only on the basis of" unless specifically stated otherwise. In other words, the expression "on the basis of" means both "only on the basis of" and "at least on the basis of".

Any reference to elements using names such as "first" and "second" as used in the present disclosure does not generally limit the amount or order of such elements. These names can be used in the present disclosure as a convenient way to distinguish between two or more elements. Accordingly, reference to the first and second elements does not imply that only two elements can be adopted, or that the first element must precede the second element in some way.

"Means" in the configuration of each apparatus described above may be substituted by "part", "circuit", "device" or the like.

In the case where "include", "including" and variations thereof are used in the present disclosure, these terms are intended to be inclusive, as in the case of the term "comprising". Furthermore, the term "or" used in the present disclosure is intended not to be an exclusive OR.

The expression "A and B are different" in the present disclosure may mean that "A and B are different from each other". Additionally, the expression may also mean that "A and B are each different from C". Terms such as "separate", "coupled" and the like may also be interpreted in the same manner as "different".

In the case where articles are added in the present disclosure due to translation, as in the case of "a", "an", and "the" in English, nouns following such articles may be plural.

Heretofore, embodiments of the present invention have been described, but the present invention is not limited to these embodiments. Various changes and modifications may be made within the scope of the present invention. The embodiments selected and described are for explaining the principle and practical application of the present invention. The present invention is used in the form of various embodiments by being changed or modified in various ways, and the various changes or modifications are determined according to expected usage. All such changes and modifications are intended to be included in the scope of the present invention defined by the appended claims, and are intended to be provided with same protection when interpreted in accordance with the breadth that is fairly, legally and rightly imparted.

What is claimed is:

1. A random access wait time setting method for setting a wait time of random access for a first terminal apparatus to perform location registration with a first base station apparatus, wherein the first base station apparatus is one base station apparatus among base station apparatuses included in a communication system, and the first terminal apparatus is one terminal apparatus among terminal apparatuses existing in a service area of the first base station apparatus, the method comprising:

a transmitting step of transmitting information from each of at least one second terminal apparatus to the first terminal apparatus, wherein each of the at least one second terminal apparatus is a terminal apparatus, among terminal apparatuses included in the communication system, that exists in a periphery of the first terminal apparatus and that is to perform location registration, the information being information indicating a base station apparatus with respect to which a terminal apparatus is to perform location registration;

a first counting step of counting, by using the information obtained in the transmitting step, the number of terminal apparatuses that are scheduled to perform location registration with the first base station apparatus, among the at least one second terminal apparatus;

a sharing step of sharing, among all terminal apparatuses that are to perform location registration in the service area, the information of each of the at least one second terminal apparatus and the first terminal apparatus, in a case where a counting result obtained in the first counting step is smaller than a predetermined value;

a second counting step of counting, by using the information that is shared in the sharing step, the number of terminal apparatuses that are scheduled to perform location registration with the first base station apparatus, among all the terminal apparatuses that are to perform location registration in the service area excluding the first terminal apparatus; and a wait time setting step of setting, on a basis of a counting result obtained in the second counting step in a case where the counting result obtained in the first counting step is smaller than the predetermined value, or on a basis of the counting result obtained in the first counting step in a case where the counting result obtained in the first counting step is at or greater than the predetermined value, a longer maximum wait time, the greater the counting result is, the maximum wait time being a maximum wait time for the first terminal apparatus to access the first base station apparatus.

2. The random access wait time setting method according to claim 1, wherein the counting result is corrected in the wait time setting step, on a basis of an amount of temporal change in the counting result.

3. A random access wait time setting method for setting a wait time of random access for a first terminal apparatus to perform location registration with a first base station apparatus, wherein the first base station apparatus is one base station apparatus among base station apparatuses included in a communication system, and the first terminal apparatus is one terminal apparatus among terminal apparatuses existing in a service area of the first base station apparatus, the method comprising:

a transmitting step of transmitting information from each of at least one second terminal apparatus to the first terminal apparatus, wherein each of the at least one second terminal apparatus is a terminal apparatus, among terminal apparatuses included in the communication system, that exists in a periphery of the first terminal apparatus and that is to perform location registration, the information being information indicating a base station apparatus with respect to which a terminal apparatus is to perform location registration;

a sharing step of sharing, among all terminal apparatuses that are to perform location registration in the service area, the information of each of the at least one second terminal apparatus and the first terminal apparatus;

a counting step of counting, by using the information that is shared in the sharing step, the number of terminal apparatuses that are scheduled to perform location registration with the first base station apparatus, among all the terminal apparatuses that are to perform location registration in the service area excluding the first terminal apparatus; and a wait time setting step of setting a longer maximum wait time, the greater a counting result that is obtained in the counting step is, the maximum wait time being a maximum wait time for the first terminal apparatus to access the first base station apparatus.

4. The random access wait time setting method according to claim 3, wherein the counting result is corrected in the wait time setting step, on a basis of an amount of temporal change in the counting result.

5. A random access wait time setting method for setting a wait time of random access for a first terminal apparatus to perform location registration with a first base station apparatus, wherein the first base station apparatus is one base station apparatus among base station apparatuses included in a communication system, and the first terminal apparatus is one terminal apparatus among terminal apparatuses existing in a service area of the first base station apparatus, the method comprising:

a transmitting step of transmitting information from each of at least one second terminal apparatus to the first terminal apparatus, wherein each of the at least one second terminal apparatus is a terminal apparatus, among terminal apparatuses included in the communication system, that exists in a periphery of the first terminal apparatus and that is to perform location registration, the information being information indicating a base station apparatus with respect to which a terminal apparatus is to perform location registration;

a movement direction estimating step of estimating a movement direction of each of the at least one second terminal apparatus;

a first counting step of counting, by using the information that is obtained in the transmitting step and information about the movement direction that is obtained in the movement direction estimating step, the number of terminal apparatuses, among the at least one second terminal apparatus, that are scheduled to perform location registration with the first base station apparatus and that are moving in a same direction as a movement direction of the first terminal apparatus;

a sharing step of sharing, among all terminal apparatuses that are to perform location registration in the service area, the information of each of the at least one second terminal apparatus and the first terminal apparatus and the information about the movement direction, in a case where a counting result obtained in the first counting step is smaller than a predetermined value;

a second counting step of counting, by using the information that is shared in the sharing step and the information about the movement direction, the number of terminal apparatuses that are scheduled to perform location registration with the first base station apparatus and that are moving in the same direction as the movement direction of the first terminal apparatus, among all the terminal apparatuses that are to perform location registration in the service area excluding the first terminal apparatus;

a first wait time setting step of setting, on a basis of a counting result obtained in the second counting step in a case where the counting result obtained in the first counting step is smaller than the predetermined value, or on a basis of the counting result obtained in the first counting step in a case where the counting result obtained in the first counting step is at or greater than the predetermined value, a longer maximum wait time, the greater the counting result is, the maximum wait time being a maximum wait time for the first terminal apparatus to access the first base station apparatus; and a second wait time setting step of referring to the counting result that is previously obtained within a temporal range extending back from a current time point by a certain amount of time, and setting the maximum wait time on a basis of the counting result that is previously obtained, in a case where the number of terminal apparatuses that are moving in the same direction as the movement direction of the first terminal apparatus, among terminal apparatuses that are scheduled to perform location registration with the first base station apparatus excluding the first terminal apparatus, is greater than a predetermined value.

6. The random access wait time setting method according to claim 5, wherein the counting result is corrected in the first wait time setting step or the second wait time setting step, on a basis of an amount of temporal change in the counting result.

7. A random access wait time setting method for setting a wait time of random access for a first terminal apparatus to perform location registration with a first base station apparatus, wherein the first base station apparatus is one base station apparatus among base station apparatuses included in a communication system, and the first terminal apparatus is one terminal apparatus among terminal apparatuses existing in a service area of the first base station apparatus, the method comprising:

a transmitting step of transmitting information from each of at least one second terminal apparatus to the first terminal apparatus, wherein each of the at least one second terminal apparatus is a terminal apparatus, among terminal apparatuses included in the communication system, that exists in a periphery of the first terminal apparatus and that is to perform location registration, the information being information indicating a base station apparatus with respect to which a terminal apparatus is to perform location registration;

a movement direction estimating step of estimating a movement direction of each of the at least one second terminal apparatus;

a sharing step of sharing, among all terminal apparatuses that are to perform location registration in the service area, the information of each of the at least one second terminal apparatus and the first terminal apparatus and information about the movement direction;

a counting step of counting, by using the information that is shared in the sharing step and the information about the movement direction, the number of terminal apparatuses that are scheduled to perform location registration with the first base station apparatus and that are moving in the same direction as the movement direction of the first terminal apparatus, among all the terminal apparatuses that are to perform location registration in the service area excluding the first terminal apparatus;

a first wait time setting step of setting a longer maximum wait time, the greater a counting result that is obtained in the counting step is, the maximum wait time being a maximum wait time for the first terminal apparatus to access the first base station apparatus; and a second wait time setting step of referring to the counting result that is previously obtained within a temporal range extending back from a current time point by a certain amount of time, and setting the maximum wait time on a basis of the counting result that is previously obtained, in a case where the number of terminal apparatuses that are moving in the same direction as the movement direction of the first terminal apparatus, among terminal apparatuses that are scheduled to perform location registration with the first base station apparatus excluding the first terminal apparatus, is greater than a predetermined value.

8. The random access wait time setting method according to claim 7, wherein the counting result is corrected in the first wait time setting step or the second wait time setting step, on a basis of an amount of temporal change in the counting result.

\* \* \* \* \*